United States Patent [19]

Hatanaka et al.

[11] Patent Number: 5,041,905
[45] Date of Patent: Aug. 20, 1991

[54] DIGITAL TELECONVERTER

[75] Inventors: Noriaki Hatanaka, Yokohama; Katsuhiko Manabe, Machida; Takashi Sasaki, Omiya, all of Japan

[73] Assignee: Ricoh Company, Ltd., Tokyo, Japan

[21] Appl. No.: 546,931

[22] Filed: Jul. 2, 1990

[30] Foreign Application Priority Data

Jul. 7, 1989 [JP] Japan ................................ 1-176845

[51] Int. Cl.⁵ .............................................. H04N 9/64
[52] U.S. Cl. ................................................ 358/21 R
[58] Field of Search .................... 358/21 R, 17, 30, 31, 358/29 C

[56] References Cited

U.S. PATENT DOCUMENTS 4,646,161  2/1987  Tsuchiya et al. ................. 358/29 C
4,991,223  2/1991  Bradley ............................ 358/21 R

FOREIGN PATENT DOCUMENTS 193684  11/1984  Japan ................................ 358/21 R Primary Examiner—Tommy P. Chin
Attorney, Agent, or Firm—Oblon, Spivak, McClelland, Maier & Neustadt

[57] ABSTRACT

A digital teleconverter includes a component signal generation circuit, an encoder for obtaining a composite signal from the component signal, an image processing unit and a selector for selecting an image processing mode. The component signal generation circuit generates component signals comprising a luminance signal and color difference signals in response to an object image transmitted from an image pickup element. The encoder converts the component signals transmitted from the component signal generation circuit to a composite signal. The image processing unit performs a digital image processing on the basis of either the component signals or the composite signal. The selector selects either a video signal processed by and transmitted from the image processing unit or an original video signal of the object image.

3 Claims, 4 Drawing Sheets

DIGITAL TELECONVERTER

BACKGROUND OF THE INVENTION

1. Field of the Invention

The present invention relates to a digital teleconverter.

2. Description of the Related Art

A filming device or a shooting device such as a video camera comprises a digital image processor which processes an image information transmitted from the camera by way of digital signals. There are two kinds of such a digital image processor. One is a type in which a composite signal is used. The composite signal is a compound of a luminance signal and a chrominance signal. The other is a type in which component signals such as the luminance signal and the chrominance signal are individually used.

With respect to the composite signal using type image processing system, the circuit for processing the signal is simple and it is unnecessary to prepare a digital memory having a large storage capacity. For example, in accordance with this system, it is possible to directly storage the video signal of NTSC (National Television System Committee) system along with a synchronizing signal in a digital memory device after converting the analogue video signal to a digital signal. Also, it is possible, vice versa, to obtain an NTSC video signal by reading the video information data storaged in the digital memory device and converting the digital data to an analogue signal. Therefore, it becomes possible to directly connect the system to the television system and directly interchange the video signals therebetween. However, the functions of the image processing system of this type are limited so that the system is only capable of carrying out the still filming operation or the stroboscopic filming operation.

On the other hand, with respect to the component signal using type image processing system, it becomes possible to widening the function of the system so that the system is capable of carrying out various functions in addition to the still function and the stroboscopic function. However, the structure of the processing system of this type is very complicated. Besides, it is necessary to prepare a digital memory device having a large storage capacity. For example, when the NTSC video signal is to be used, it is necessary to prepare a selector circuit for separating the luminance signal (Y) and the chrominance signal (C) from each other and a demodulation circuit for demodulating the signals (Y) and (C). Further, it is necessary to prepare and arrange an A/D converter for each of the luninance signal and the chrominance signal. Also, a D/A converter and an NTSC encoder have to be interposed between the system and the television system to transmit the video information data read from the digital memory device to the television. Further, a large amount of power is consumed by the A/D converter since it is necessary to drive the converter at a high speed. Therefore, it is requied to reduce the number of the A/D converters used in the processing system from the stand point of energy consumption.

SUMMARY OF THE INVENTION

It is therefore an object of the present invention to provide a digital teleconverter which can carry out the digital signal processing operation when the composite signal is supplied and when the component signals are supplied as well, and which teleconverter makes it possible to reduce the storage capacity of the memory device and perform a wide variety of functions with a small amount of power consumption.

The object of the invention can be achieved by a digital teleconverter comprising: a component signal generating circuit for generating a luminance signal and a color difference signal from an image transmitted from an image pickup element; an encoder for converting the component signals transmitted from the component signal generation circuit to a composite signal; an image processing system for performing a digital image processing operation on the basis of the component signals or the composite signal; and a selection system for selecting either the video signal processed by and transmitted from the image processing system or the original video signal transmitted from the image pickup element.

Advantages of the above-mentioned digital teleconverter are that any kind of video signals can be processed by the image processing system irrespective of whether the component signals are supplied or the composite signal is supplied instead by selecting the component signals or the composite signal, that the structuer can be simplified by processing the component signals in accordance with a time series processing mode, that the storage capacity of the memory device for processing the digital image can be reduced and that a wide variety of functions can be carried out with a small amount of power consumption.

Further objects and advantages of the present invention will be apparent from the following description of the preferred embodiments of the invention as illustrated in the accompanying drawings.

DESCRIPTION OF THE PREFERRED EMBODIMENTS

Figure 1:
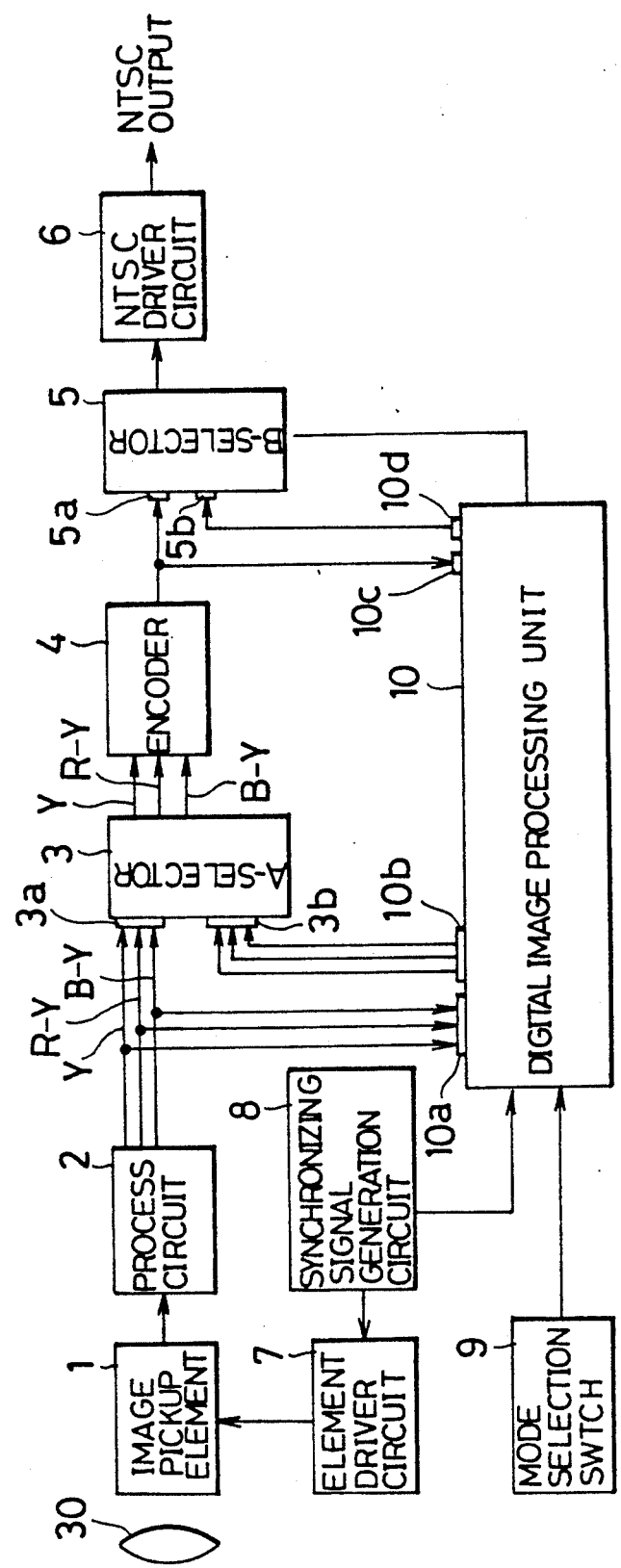
FIG. 1 is a block diagram for representing an example of the structure of the digital teleconverter in accordance with the present invention.

FIG. 1 illustrates an embodiment of the present invention. An image of an object (not shown) to be shot is input to an image pickup element 1 through a shooting lens 30. The element 1 converts the image to an electric signal. An element driver circuit 7 is connected to an input side of the image pickup element 1. The driver circuit 7 controls the reading function to read out the image information from the element 1 in accordance with a synchronizing signal transmitted from a synchronizing signal generation circuit 8. A process circuit 2 is connected to an output side of the element 1. The process circuit 2 separates a luminance signal (Y) and chrominance signals which comprises color difference signals (R−Y) and (B−Y) from the electric video signal transmitted from the element 1. An output side of the circuit 2 is connected to an input terminal 3a of an A-selector 3 and to an input terminal 10a of a digital image processing unit 10. An output terminal 10b of the unit 10 is connected to an input terminal 3b of the A-selector 3. The A-selector 3 selects the signals comprising the luminance signal and the chrominance signals of the moving image transmitted from the circuit 2 or the signals which are transmitted from the unit 10 and comprise the luminance signal and the chrominance signals in accordance with a control signal transmitted from the unit 10.

An output side of the A-selector 3 is connected to an encoder 4 which converts the luminance signal and the chrominance signals to a composite signal, i.e., an NTSC type compound video signal. The output side of the encoder 4 is connected to an input terminal 5a of a B-selector 5. The output side of the encoder 4 is also connected to an input terminal 10c of the unit 10. An output terminal 10d of the unit 10 is connected to an input terminal 5b of the B-selector 5.

The B-selector 5 selects either the composite signal of the moving image transmitted from the encoder 4 or the composite signal transmitted from and processed by the unit 10 in accordance with the control signal transmitted from the unit 10. The output side of the B-selector 5 is connected to an NTSC output terminal through an NTSC driver circuit 6 which processes the NTSC video signal. The output side of the synchronizing signal generation circuit 8 is connected to the unit 10. Also, an output side of a mode selection switch 9 is connected to the unit 10. The switch 9 selects either an operation mode for processing the digital composite signal or an operation mode for processing the digital component signals.

Figure 2:
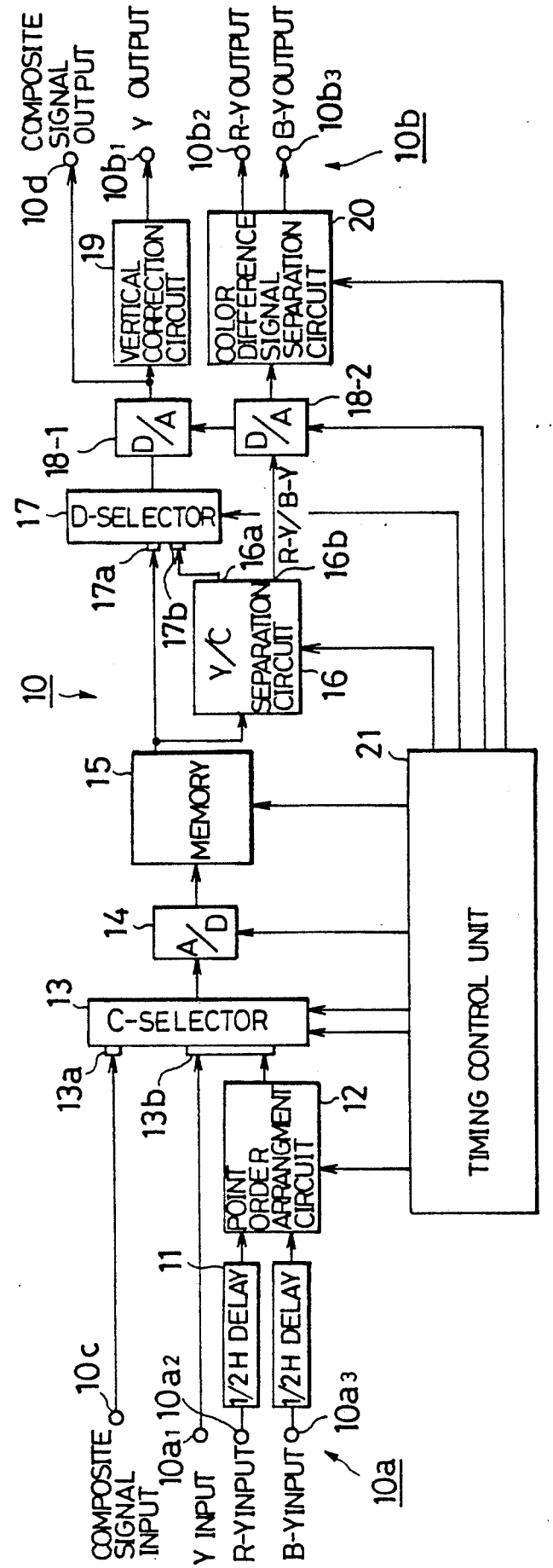
FIG. 2 is a block diagram for representing a structure of the digital image processing system assembled in the structure of FIG. 1.

FIG. 2 illustrates the construction of the digital image processing unit 10. The unit 10 processes the video signal in accordance with the operation mode selected by the mode selection switch 9. The switch 9 selects either the mode in which the image processing operation such as still processing or stroboscopic processing of the composite signal of the video information is carried out or the mode in which the image processing operation for magnifying the video image of the component signals twice is carried out.

The input terminal 10a of the unit 10 comprises three terminals $10a_1$, $10a_2$ and $10a_3$. The luminance signal (Y) transmitted from the circuit 2 is input to the terminal $10a_1$ which is connected to an input terminal 13b of a C-selector 13. The input terminal 10c of the unit 10 to which terminal the composite signal is transmitted from the encoder 4 is connected to an input terminal 13a of the C-selector 13. Also, the color difference signals (R−Y) and (B−Y) are transmitted from the circuit 2 to the input terminals $10a_2$ and $10a_3$ of the unit 10, respectively. Each of the terminals $10a_2$ and $10a_3$ is connected to a respective delay circuit 11 for delaying the timing of the color difference signals for ½H. The output sides of the delay circuits 11 are connected to a point order arrangement circuit 12 which makes a time series data by alternately arranging signals (R−Y) and (B−Y) in accordance with a timing signal transmitted from a timing control unit 21. The output side of the circuit 12 is connected to the input terminal 13b of the C-selector 13.

The C-selector 13 selects either the composite signal or the component signals in response to the control signal transmitted from the unit 21 in accordance with the operation mode selected by the switch 9. The output side of the C-selector 13 is connected to a memory device 15 through an A/D converter 14. The A/D converter 14 and the memory device 15 transmit the data in accordance with the timing signal transmitted from the unit 21.

The output side of the memory device 15 is connected directly to an input terminal 17a of a D-selector 17. The output side of the memory device 15 is also connected to a Y/C separation circuit 16 which separates the luminance signal and the chrominance signal from each other in accordance with the timing signal transmitted from the unit 21. An output terminal 16a for the luminance signal of the circuit 16 is connected to an input terminal 17b of the D-selector 17. An output terminal 16b for the chrominance signal of the circuit 16 is connected to a D/A converter 18-2. The circuit 16 comprises two line memories.

The D-selector 17 selects either the signal transmitted from the memory device 15 or the luminance signal transmitted from the circuit 16 in response to the control signal transmitted from the unit 21 in accordance with the operation mode selected by the switch 9. The output side of the D-selector 17 is connected to a composite signal output terminal 10d through a D/A converter 18-1. The output side of the D-selector 17 is also connected to a vertical correction circuit 19 which corrects the video information with respect to the vertical direction thereof in each of the video signal fields after the digital image processing treatment. The output side of the circuit 19 is connected to a luminance signal output terminal $10b_1$. The output side of the D/A converter 18-2 is connected to an output terminal $10b_2$ for the color difference signal (R−Y) and to an output terminal $10b_3$ for the color difference signal (B−Y) through a color difference signal separation circuit 20 which separates the color difference signals (R−Y) and (B−Y) from each other. The circuit 20 comprises a sample hold circuit using an analogue switch or the like.

The function of the digital teleconverter having the structure as mentioned above is described hereinafter.

The image pickup element 1 transmits a video signal in accordance with the control signal supplied from the element driver circuit 7. The video signal is divided to the luminance signal and the color difference signals (R−Y) and (B−Y) by the process circuit 2. The luminance signal and the color difference signals are transmitted to the input terminal 10a of the digital image processing unit 10. The luminance signal and the color difference signals are also transmitted to the encoder 4 through the A-selector 3. The encoder 4 converts the signals to a composite signal of NTSC type. The NTSC composite signal is transmitted to the input terminal 10c of the unit 10.

When the mode selection switch 9 selects the still or stroboscopic image processing mode which is the composite video signal information data processing mode, the C-selector 13 selects the composite signal supplied to the input terminal 13a through the input terminal 10c in accordance with the control signal transmitted from the timing control unit 21. The composite signal is transmitted from the C-selector 13 to the A/D converter 14 which converts the analogue signal to a digital signal in response to the timing signal which is required for processing the video information data and transmitted from the unit 21. The digital composite signal is then transmitted to the memory device 15 and stored therein in accordance with the timing signal transmitted from the unit 21. It is to be noted that the video information data stored in the memory 15 is one field of video information including a vertical synchronizing signal and a horizontal synchronizing signal.

When a timing signal for reading the video information data of still or stroboscopic video mode is transmitted to the memory 15 from the unit 21, the video information stored in the memory 15 is read out therefrom in accordance with the timing process for the odd number fields and the even number fields, respectively. The video information read from the memory 15 and processed by the still treatment or the stroboscopic treatment is supplied to the D/A converter 18-1 through the D-selector 17. The video information is converted to an analogue signal by the D/A converter 18-1 and transmitted to the composite signal output terminal 10d.

The composite signal which is processed by the still image treatment or the stroboscopic image treatment is transmitted from the output terminal 10d to the input terminal 5b of the B-selector 5. The composite signal is then transmitted to the NTSC output terminal through the NTSC driver circuit 6. It is to be noted that the composite signal which is not processed by the still image treatment or the stroboscopic image treatment is not supplied to the B-selector 5 since, in this operation mode, the input terminal 5b is selected by the unit 10 in response to the image processing mode selected by the switch 9, so that the other input terminal 5a which is the terminal for introducing the signal which is not treated by the still image treatment or the stroboscopic image treatment transmitted from the encoder 4 to the B-selector 5 is cut off in this operation mode.

On the other hand, when the switch 9 selects an image processing mode in which the image is treated to be magnified twice in this particular embodiment, the C-selector 13 selects the component signals comprising the luminance signal and the chrominance signals transmitted to the input terminal 13b of the C-selector 13 from the input terminal 10a.

Figure 3:
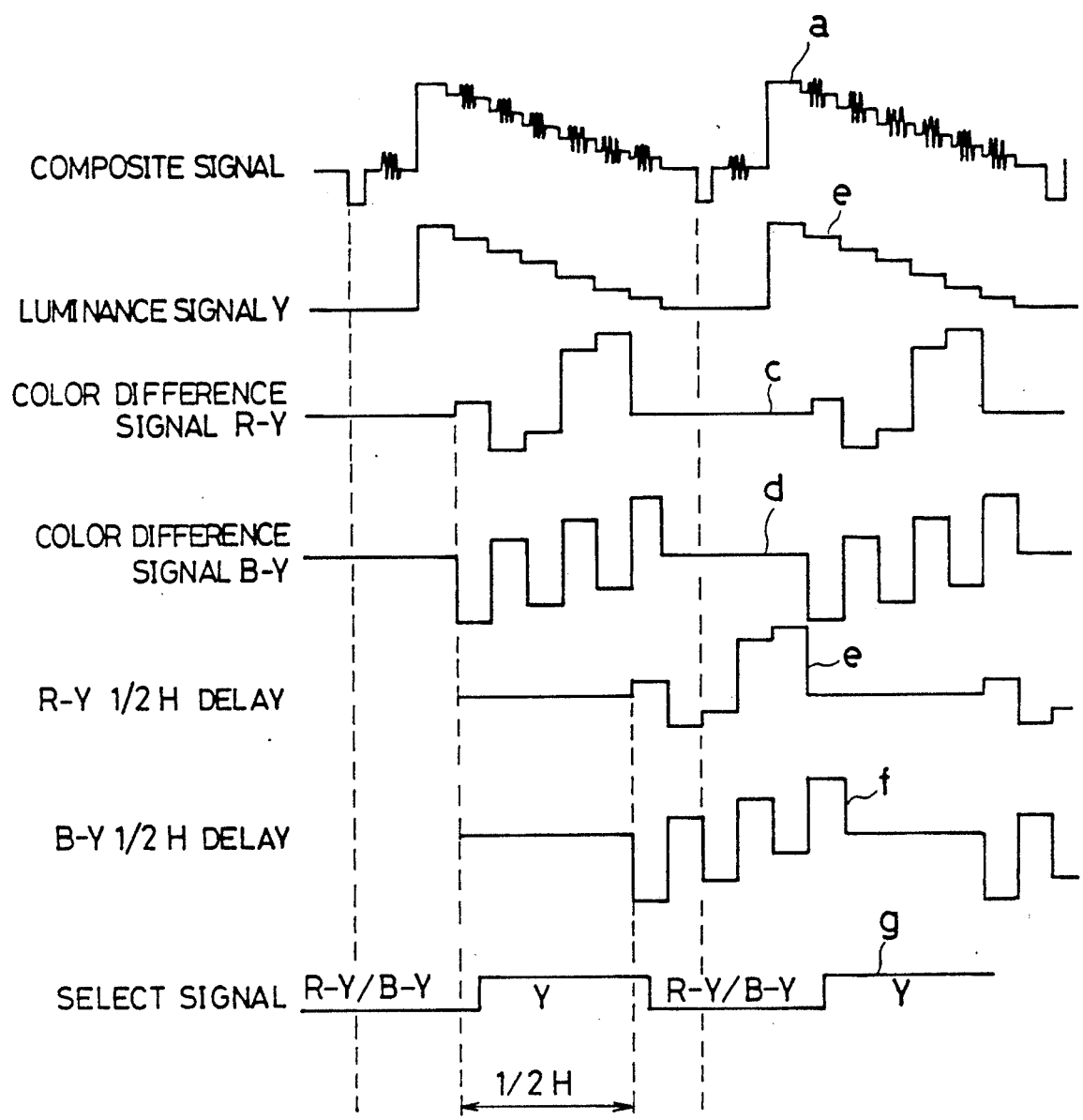
FIG. 3 is a time chart of the function of the delay circuit used in the structure of FIG. 2.

In that case, the luminance signal (Y) is directly transmitted to the C-selector 13 from the input terminal $10a_1$. The color difference signals (R−Y) and (B−Y) are transmitted to the respective ½H delay circuits 11 which delay the signal by half of the horizontal scanning span. This is to avoid overlapping the luminance signal in the magnified area and each of the chrominance signals, which makes it possible to process the signals in one time series. This is based on that the necessary area for the signal magnified twice in the horizontal direction is half of the normal video area of one horizontal field (1H). Therefore, as represented by lines b, e and f in the time chart of FIG. 3, by delaying the signals (R−Y) and (B−Y) by ½H, the luminance signal in the magnified area does not overlap each of the delayed signals (R−Y) and (B−Y). It is to be noted that the signals (R−Y) and (B−Y) do not require a very large band area so that there is no problem if the band area thereof becomes half in the A/D converting process carried out by the A/D converter at a periodic cycle twice as that of the luminance signal.

Figure 4:
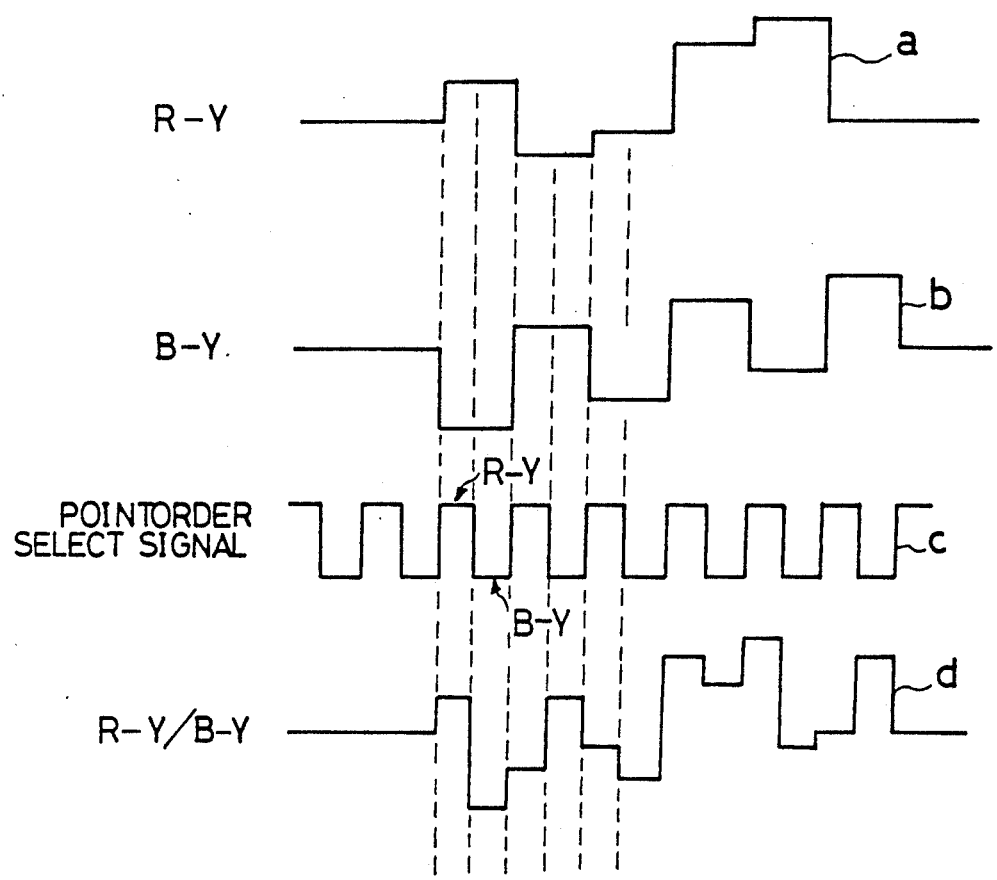
FIG. 4 is a time chart of the function of the point order arrangement circuit used in the structure of FIG. 2.

The delayed color difference signals are transmitted to the point order arrangement circuit 12. The circuit 12 receives a select signal, as represented by the line c in FIG. 4, from the timing control unit 21. The frequency of the select signal c is a half of that of the A/D converter which processes the color difference signals. When the select signal is in a level high (H), the color difference signal (R−Y) is selected, while when the select signal is in a level low (L), the color difference signal (B−Y) is selected. That is, the circuit 12 functions to alternately select the signals (R−Y) and (B−Y) to form a signal (R−Y/B−Y), as represented by the line d in FIG. 4, in accordance with the select signal c. The signal (R−Y/B−Y) is transmitted to the input terminal 13b of the C-selector 13.

The C-selector 13 selects the input terminal 13b instead of 13a since the image magnifying mode is selected by the switch 9 in this case. The video information of the selected component signals is converted to a digital signal by the A/D converter 14 and stored in the memory 15 in accordance with the timing signal transmitted from the unit 21. It is to be noted that the memory 15 storages the luminance signal, the signal (R−Y) and the signal (B−Y) in this order.

When the video information is to be read out from the memory 15, the luminance signal (Y) and the color difference signal (R−Y/B−Y) which are time-shared in the same time series are read in such a state that the original image is twice magnified in accordance with the timing signal transmitted from the unit 21. The luminance signal and the color difference signal read from the memory 15 are transmitted to the input terminal 17a of the D-selector 17 and also to the Y/C separation circuit 16.

The circuit 16 is constituted from two line memories (not shown). The information of the luminance signal and the color difference signal are written in the memories at the same timing of writing the information in the memory 15.

The storaged information of the luminance signal (Y) and the color difference signals (R−Y), (B−Y) are read out from the line memories of the circuit 16 at a periodic interval of twice as that of the timing of writing the information in the memory 15. It is to be noted that the circuit 16 for writing and reading the information is controlled by the timing signal transmitted from the unit 21. It is also to be noted that by reading the information of the signals in accordance with the above mentioned way, it becomes possible to process at the same time to separate the luminance signal and the color difference signal and magnify the image in the horizontal direction.

The read luminance signal is transmitted to the input terminal 17b of the D-selector 17. Also, the read color difference signal comprising signals (R−Y) and (B−Y) is transmitted to the D/A converter 18-2.

The D-selector 17 selects the input terminal 17b since the mode of magnifying the image is selected in this case so that the luminance signal (Y) is transmitted to the D/A converter 18-1 through the D-selector 17.

The D/A converter 18-1 converts the luminance signal (Y) to an analogue signal. The signal (Y) converted to the analogue signal is processed by the correction circuit 19 so that the video information is corrected in the vertical direction when the image is magnified. After that, the signal (Y) is transmitted to the output terminal $10b_1$.

The color difference signal (R−Y/B−Y) is converted to an analogue signal by the D/A converter 18-2. The analogue signal is transmitted to the color difference signal separation circuit 20 which separates the signal (R−Y) and the signal (B−Y) from each other. The separated signals (R−Y) and (B−Y) are transmitted to the output terminals $10b_2$ and $10b_3$, respectively.

The luminance signal and the color difference signal output from the digital image processing unit 10 in a manner mentioned above are transmitted to the input terminal 3b of the A-selector 3. The A-selector 3 selects the input terminal 3b since the image magnifying mode is selected in this case so that the signals introduced through the input terminal 3b are transmitted to the encoder 4 which converts the signals to an NTSC composite signal. The composite signal is transmitted to the input terminal 5a of the B-selector 5. The B-selector 5 selects the input terminal 5a since the image magnifying mode is selected for now. Therefore, the signal introduced through the terminal 5a is transmitted to the NTSC driver circuit 6 and then to the NTSC output terminal.

As mentioned above, in accordance with the embodiment of the digital teleconverter of the present invention, it is possible to select either the composite signal or the component signal by the C-selector 13 arranged in the digital image processing unit 10 so that it becomes possible to process various kinds of image treatment in accordance with the selected signal.

Also, since it is possible to select either the component signal or the composite signal, as mentioned above, it becomes unnecessary to prepare a memory device for sroraging necessary date for processing the image information for every signal treatment mode, which makes it possible to reduce the storage capacity of the memory.

Besides, the digital teleconverter of the present invention is capable of processing wide variety of functions due to the provision of the digital image processing unit 10 which enables to process not only the composite signal but also the component signal as well.

Further, in the image magnifying process of the component signal treatment, the luminance signal and the color difference signals can be arranged in the same time series by delaying the color difference signal by ½H, which makes it possible to use the same A/D converter in common for the luminance signal and the color difference signal, which reduces the power consumption and lowers the cost of producing the teleconverter.

As precisely mentioned above, in accordance with the present invention, one of the component signal and the composite signal is selected by the selector provided in the image processing unit which is capable of processing any of the signals as one processing system in a way of digital image treatment. Therefore, it becomes possible to provide a digital teleconverter which is capable of processing any of the digital component signal and the digital composite signal without increasing the storage capacity of the memory and performs wide variety of functions with a small power consumption.

Many widely different embodiments of the present invention may by constructed without departing from the spirit and scope of the present invention. It should be understood that the present invention is not limited to the specific embodiments described in the specification, except as defined in the appended claims.

What is claimed is:

1. A digital teleconverter comprising:
   a component signal generation circuit for generating component signals comprising a luminance signal and color difference signals in response to an object image transmitted from an image pickup element;
   an encoder for converting said component signals transmitted from said component signal generation circuit to a composite signal;
   an image processing unit for performing a digital image processing on the basis of either said component signals or said composite signal; and
   a selector means for selecting either a video signal processed by and transmitted from said image processing unit or an original video signal of said object image.

2. A digital teleconverter according to claim 1, wherein said image processing unit comprises a selector for selecting one of said component signals and said composite signal so that a portion of said unit for performing said digital image processing is constituted by one unit.

3. A digital teleconverter according to claim 1, wherein said image processing unit comprises a circuit for arranging said component signals in a predetermined time order so as to convert said component signals to a signal of one time series so that the number of A/D converters for converting said component signals to digital signals is minimized.

* * * * *